United States Patent Office 2,770,743
Patented Nov. 13, 1956

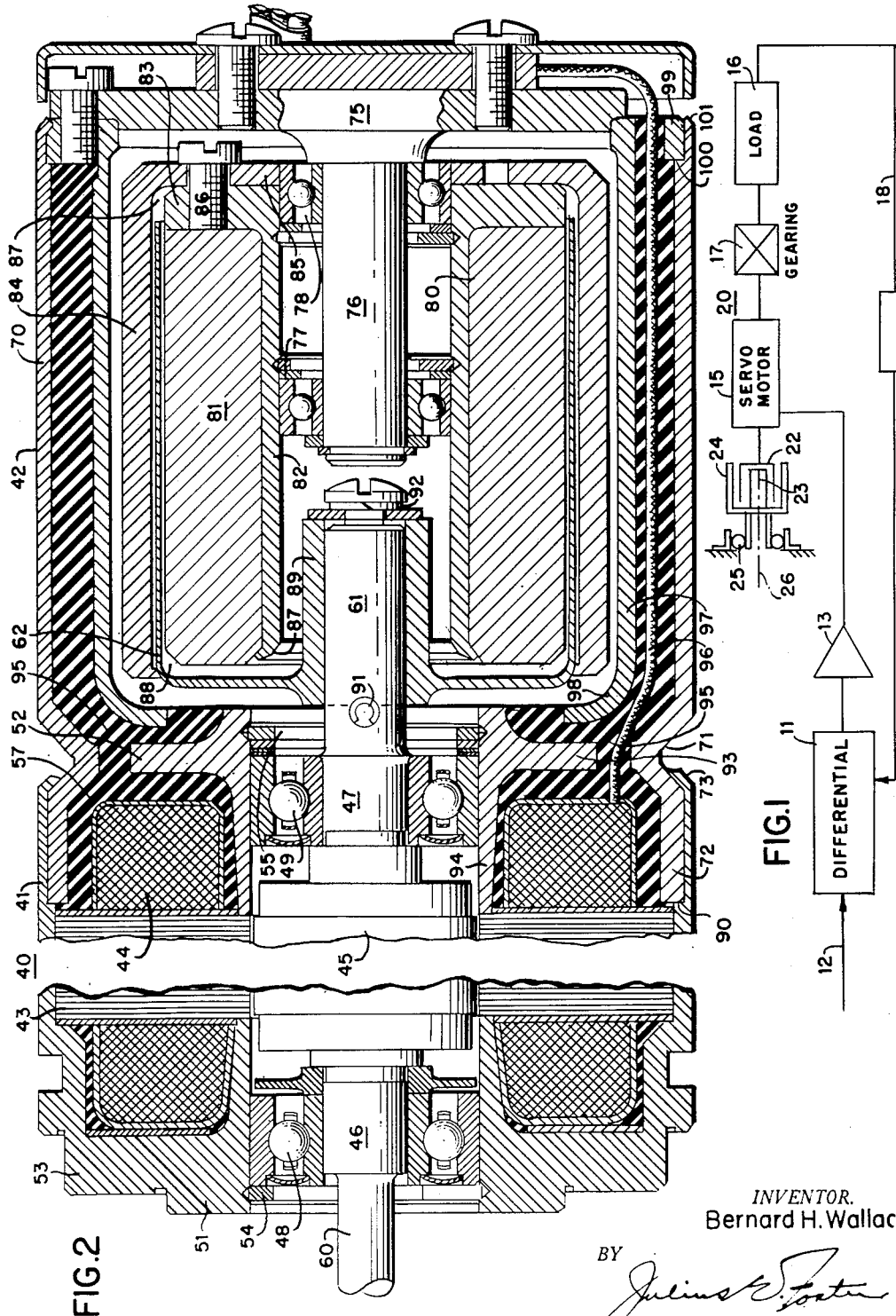

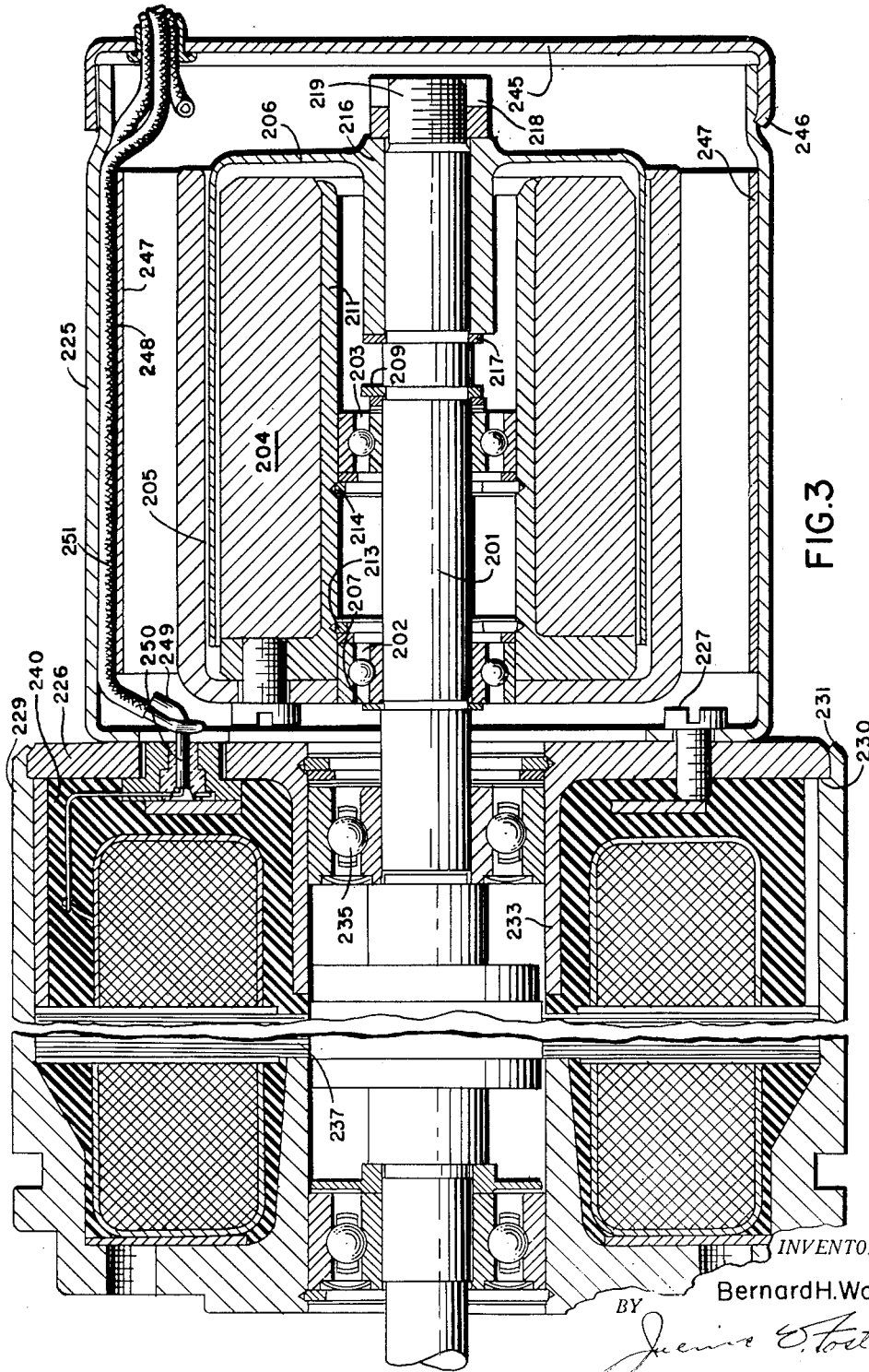

2,770,743

SERVO SYSTEM AND SERVO MOTOR WITH BUILT-IN DAMPING ACTION

Bernard H. Wallach, New York, N. Y., assignor to Kearfott Company, Inc., Little Falls, N. J., a corporation of New York Application October 12, 1954, Serial No. 461,816

4 Claims. (Cl. 310—74)

This invention relates to positional servo motor systems with auxiliary viscous damping applied, and relates particularly to a servo motor constructed to have a built-in viscous damping action.

One object of this invention is to provide a servo motor of simple construction with an auxiliary permanent magnet suitably supported for free rotation and electromagnetically coupled to the rotor to enable the magnet to impose an inertial damping action on the servo motor.

Another object of this invention is to provide a servo motor with a damping structure built-in, in which damping units of different torques may be applied to permit the motor to be applied for different inertia loads.

Another object of this invention is to provide a servo motor with a built-in damping structure arranged to impose a viscous inertial damping action on the motor shaft.

Another object of the invention is to provide a servo motor having one end of its drive shaft extending free for connection to an external load, and the other end of its drive shaft supporting and connected to an inertial damping unit made integral with the motor.

This invention is directed to a servo motor system in which viscous damping action is achieved by the inertia restraint of a free body which is magnetically acted on by an element supported on and connected to the motor shaft. The damping device consists essentially of a cylindrical cup of conducting but preferably of non-magnetizable material, that is connected to and supported on the motor shaft to extend into a concentrical cylindrical air gap that is filled with a flux field of a magnet. The gap herein is defined between the surface of an annular permanent magnet and a cylindrical keeper for that magnet. The magnet and its keeper are supported as a unit on a pair of bearings mounted co-axially with the motor shaft to enable the magnet and its keeper to be free to rotate as a unit in response to the reaction between the magnetic field in the gap and the eddy current field established in the rotatable cup movable in the gap by the motor.

The manner in which the system functions and the construction of the motor and its damping unit are shown in the accompanying drawings, in which Figure 1 is a block diagram of a positioning servo loop including a motor schematically indicated as embodying the present invention; and Figure 2 is a longitudinal vertical sectional view of one type of construction of a damped servo motor made in accordance with the principles of this invention, wherein the damping unit is mounted separately from the rotor shaft of the servo motor; and Figure 3 is a similar view of another type of construction of such a motor, wherein the damping unit is mounted on the rotor shaft of the servo motor.

As shown in Figure 1, a servo loop may be briefly illustrated as including a differential device 11 arranged to receive an external command or signal force 12, which for convenience is indicated in the system as being an electrical signal, and which is transmitted through the differential device 11 to a suitable amplifier 13, which then supplies operating energy to a servo motor 15 to operate a load 16 through suitable gearing 17 to follow the instructions or directions of the input signal 12.

A signal circuit from the motor output to the differential 11 is indicated by a circuit 18 which informs the differential 11 of the output condition and position of the load 16 in following the instructions of the input signal 12. The difference between the input signal 12 and the signal on conductor 18 represents the difference or deviation or error signal which is isolated in the differential 11 and fed through the amplifier 13 to control the operation of the servo motor 15.

In order to enable the servo motor to follow the character and amplitude of the signal 12, or any changes therein, it is desirable, and well known as established practice, to introduce a damping force on the motor movement to limit or prevent oscillations that would otherwise result from the inertia of the rotor of the motor and the connected gearing 17 and the load 18. For such damping action in this application, the motor 15 is provided with a suitable damper 20, which is schematically indicated as including a cylindrical or cup-shaped element 22, directly coupled to the shaft of the motor 15, and a fly-wheel 23 in the form of a permanent magnet, with a cylindrical keeper 24 fixed to the magnet and both suitably supported for free rotation on bearings 25 co-axial with the main motor axis which is indicated by the broken line 26.

The general arrangement and construction of the servo motor 15 together with the damping unit 20 as an integral device in association with the servo motor 15, is shown in more detail in Figures 2 and 3.

In the construction shown in Figure 2, the damping unit is constructed as an independent assembly to be supported separately from the rotor shaft of the motor.

In Figure 3 is shown a construction in which the damping unit is on the rotor shaft itself.

As shown in Figure 2, the servo motor unit 40 comprises a motor element 41 and a damping element 42.

The motor element 41 is shown as consisting of a stator core 43 with suitable stator windings 44, and a rotor element 45 provided with two journals 46 and 47 respectively supported in two ball bearings 48 and 49. The two bearings 48 and 49 in turn are respectively supported in two end walls 51 and 52 of the main motor housing 53. The bearings are shown held in position by suitable snap ring assemblies 54 and 55. The stator windings 44 are shown held in position and insulated from the housing 53 by a thermo-setting plastic 57, such as the material known commercially as Araldite.

The outer rotor journal 46 at the front end of the motor continues into an extension to serve as a drive shaft 60, and the inner journal 47 of the rotor shaft has an extension which serves as a stub-shaft 61 to support and drive a cylindrical cup 62 that serves as a damping element for the motor shaft.

The rotor stub shaft 61 and the damping or drag cup 62 extend beyond the inner end wall of the motor housing 41 into the space in the damping unit 42.

The damping unit 42 consists, generally, of an outer housing 70 of cylindrical form, having an inwardly flanged portion 71 of substantially V-shape with a continuous cylindrical anchoring portion 72 to extend into and seat in the inner end of the motor housing 41. After such assembly, the end of the motor housing is peened over at 73 to form a crimping and locking flange to hold the housing 70 of the damping unit 42 tightly anchored on the motor housing 41.

The outer end of the damping housing 70 is closed by an end plate 75. The end plate 75 embodies and supports as an integral part of itself a pin 76 which serves as a support for two spaced bearings 77 and 78. Those two bearings serve to support a fly-wheel structure 80 for free rotation on the pin 76. The pin 76 is co-axially aligned with the stub shaft 61 of the motor rotor, thereby assuring rotation of fly-wheel 80 and of the drag cup 62 about the same common main axis of the motor.

The fly-wheel 80 constitutes the damping magnet assembly. It includes a permanent magnet 81 in the form of a thick-walled cylinder fitted over and seated on a cylindrical carrier 82 of low permeability that rests on and rotates with the bearings 77 and 78. The magnet carrier 82 has an integral flanged end-wall 83 which supports and carries a cylindrical shell 84 of cup shape which is of high permeability, to serve as an armature or keeper for the magnet 81. The magnetic keeper 84 is provided with a radially inward flange 85 at its outer end which seats on and against the flange 83 of the magnet carrier 82. The two flange elements 83 and 85 are tightly secured to each other by suitable securing means such as bolts 86.

The magnet body 81 is anchored on its carrier 82 between the flanged end-wall 83 and a peened-over flanged end 87.

The magnet 81 with its supporting carrier 82 and its armature or keeper 84 together constitute the fly-wheel mass by means of which the damping torque is to be impressed on the rotor of the motor. The magnet 81 and its keeper 84 are spaced apart radially and are thus separated by a cylindrical gap 88 which is concentric with the main axis of the motor shaft. The dimensions of the drag cup 62 are such that the cylindrical body of the drag cup 62 extends into the cylindrical magnetic gap 88, and rotates freely in that gap without touching the elements of the magnetic fly-wheel structure.

The drag cup 62 is provided with a substantial hub 89, which is anchored on and keyed to stub shaft 61 of the rotor by suitable means, shown as a shaft pin 91 and a friction washer assembly 92 at the end of the stub shaft 61.

The drag cup 62 is preferably made of a light-weight metal that is of relatively low resistance and that is nonmagnetic. The relative movement between the drag cup 62 and the magnet 81 generates eddy currents in the cup, and the reaction between the magnetic field set up by those eddy currents and the magnetic field in the air gap of the magnet, creates a reaction which serves as a damping torque on the drag cup and the rotor shaft.

The co-axial alignment of the motor and the drag cup with the fly-wheel magnet assembly permits the design to be made in a closely coupled arrangement that takes up a minimum amount of space with minimum weight to accomplish the damping action desired.

There are other features of construction that may be examined in order to see how structural strength is achieved.

The housing shell 70 for the damping unit, embodies, in addition to the V-shaped section 71 and the extension 72, a radial flanged wall 93 extending inwardly from the base of the V-shaped section 71 to terminate in and support a bearing supporting ring 94. The housing shell 71 with its extension 72, and the radial wall 93, and the bearing supporting ring portion 94, all constitute one integral unit. The radial wall 93 is provided with several openings 95 to serve as outlet spaces for the conductors 96 between the motor terminals and the stator windings 54, as well as to provide openings for the self-hardening plastic 57 which is used to hold various elements of the assembly in fixed and bonded positions.

When the shell 70 of the damping unit is to be assembled on the motor shell 53, the end faces of the shell extension 72 and of the bearing supporting ring 94 are pressed home in the motor shell 53, against a shoulder 99 to receive the extension 72 of the damping unit shell 70. The end face of the bearing supporting ring 94, at the same time, bears against the stack of stator laminations 43, so the two shells, namely the motor shell 53 and the damping housing shell 70, are in relatively rigid relationship, while the inner end edge 73 of the motor housing shell is peened over to engage the V-shape portion 71 of the damping housing shell 70.

In order to provide adequate support for the closure plate 75 that supports the auxiliary pin 76, a cylindrical sleeve 97 is supported in co-axial position, radially spaced from and within the shell 70 of the housing for the damping unit. This sleeve 97 is provided with an internally directed flange portion 98 adjacent to the inner end 93 of housing shell 70. The outer end of the sleeve 97 is provided with a thickened annular boss or flange 99 that fits into and seats against a shoulder 100 at the outer end of the damping housing shell 70 and is then anchored in such seated position by a peened-over portion 101 at the end of the housing shell 70.

During assembly, the motor housing, with its stator in position, and the damping unit shell 70 are secured together with the inside sleeve 97 pressed into position on the damping shell housing 70. The open spaces around the stator core and windings, and the communicating spaces between the motor stator and the damping unit shell housing 70 and the inner ring 97, are then filled with a thermo-plastic material which is then permitted to harden and to hold the motor housing and the damping unit housing in rigid assembled position as an integral unit. The sleeve 97 is likewise anchored tightly in position within the damping unit housing.

The internal surfaces of the motor stator unit are then co-axially bored to provide bearing ring surfaces for the bearings 48 and 49. That bore of the same diametral dimension serves to provide a short symmetrical cylindrical air gap between the rotor and the stator. The rotor 45 is then assembled in position in an operation that simultaneously positions the bearing 48 and 49 in place. The limiting snap rings 54 and 55 are then placed in position in their corresponding grooves which will have been previously prepared, and the rotor is then in position to receive the drag cup 62 on the stub shaft extension 61.

The magnet assembly is then mounted on the supporting pin 76, and the end plate 75, with the magnet assembly in position, is then axially shifted into position to place the magnet assembly in its operating position as shown. The end plate 75 is then anchored on the end boss 99 of the sleeve 97, which serves to provide the support for the plate 75 and the bearing 76.

The construction shown in Figure 2 provides for the maximum damping action between the drag cup and the magnet. Where the servo motor is to be applied to a load where less drag action is required, the size of the drag cup axially, or the axial dimension of the magnet, or those same dimensions of both the drag cup and the magnet may be diminished to reduce the resulting damping action. For that purpose the magnet-supporting plate may be replaced by a similar plate carrying a smaller magnet, or the drag cup itself may be replaced by one having smaller dimensions.

The second modification of the invention, as shown in Figure 3, is similar to that illustrated in Figure 2, except that the damping unit is mounted with the magnet structure supported directly on the rotor shaft of the motor. The parts of the motor itself are the same as the parts shown in Figure 2. In this second modification in Figure 3, however, the motor rotor is mounted on a longer shaft, having a longer back extension 201 to support both the magnet and the drag cup.

Two bearings 202 and 203 are supported on shaft extension 201 to provide free rotatable support to the magnet structure 204. This magnet structure 204 consists of the same elements which make up the magnet 81 of Figure 2. This magnet 204 also has a cylindrical air gap 205 to accommodate the drag cup 206, which is similar to the drag cup 62 of Figure 2.

The bearings 202 and 203 are slip-fitted onto the shaft extension 201 and are then held in their respective positions on that shaft extension 201 by their associated snap rings 207 and 209. The magnet carrier 211 is held in fixed position on the two bearings 202 and 203 by two snap rings 213 and 214 which prevent axial movement of the magnet on those two bearings.

The drag cup 206 is supported on its integral hub 216 which is held in fixed position on the shaft extension 201 by a snap ring 217 and by a lock nut assembly 218 that fits over the threaded outer 219 of the shaft extension 201. A cylindrical housing shell 225 encircles the damping magnet 204 and the drag cup 206 and is in turn supported on an end plate 226 by suitable bolts 227.

The end plate 226 is pressed onto the end of the main motor housing 229, against a shoulder or seat 230, and is locked in position by the adjacent edge of the housing 229 being peened over a tapered corner 231 of the plate 226.

The plate 226 embodies an inwardly extending cylindrical hub portion 233, which serves, after suitable machining, to support one of the main bearings 235 for the rotor shaft. During the operation of preparing the motor stator, after the stator windings have been assembled on the laminated core structure 237, all of the spaces and holes in the stator are filled with a thermosetting plastic material 240, which serves also as a strong bonding agent to aid in holding the end plate 226 rigidly in position as part of the motor structure.

The end plate 226, when thus anchored, provides adequate support for the inner motor bearing 235 and for the damping unit which is supported on the shaft extension 201. The outer end of the damping unit housing 225 is open to provide access to the chamber in which the magnetic damping unit is to be disposed. After the entire structure is thus assembled, a closure cap 245 is applied to the housing 225, and then suitably crimped or staked in place as at the point 246 to prevent casual removal or displacement of the cap 245.

The terminals to the motor stator windings are shown supported on the motor end plate 226 and are illustrated as consisting of through-conductor terminals 249 consisting of a metallic conductor supported by an insulator 250 which is suitably anchored on the metal plate 226. Conductors 251, from these terminals 249, extend through the space in the damping unit housing shell 225 and out through the cover 245 where they are then available for connection to an external circuit.

In the housing shell 225 these conductors are supported against displacement by a clamping cylinder 247 whose outer peripheral surface fits snugly against the inner wall of the housing shell 225. To accommodate the conductors, the clamping cylinder 247 is provided with a groove lengthwise in its periphery to constitute a small lengthwise fluted section 248 to hold the conductors 251 in place.

What is claimed is:

1. A servo motor with built-in damping, comprising a motor having a stator, a stator housing, and a rotor provided with a main drive shaft at one end of the rotor and with a co-axial stub shaft extension at the other end of the rotor, and a damping device for the motor, said device consisting of a shell housing anchored on and braced to the motor stator housing as a co-axial extension thereof beyond and encircling the stub shaft extension; an end-wall closure for said shell housing; a bearing pin supported on said end-wall closure and disposed co-axially in line with said motor stub shaft; a permanent magnet structure supported for free relative rotation on said bearing pin, said magnet structure including a magnet and a magnetizable keeper radially spaced therefrom to define a cylindrical air gap concentric with the axis of the bearing pin; and a cylindrical metallic cup extending into said air gap of said magnet and having an end hub of said cup supported on and secured to said stub shaft of the motor.

2. A servo motor with built-in viscous damping, comprising a motor having a motor with a main drive shaft on one end of the rotor and with a stub shaft extension on the other end of the rotor, both shafts being co-axially aligned on the rotor axis; and a damping device for the motor, said device consisting of a permanent magnet and a keeper radially spaced therefrom to define a cylindrical air gap concentric with the motor stub shaft, bearing means supporting the magnet and keeper for free rotation relative to the stub shaft, and a cylindrical cup supported on and secured to the stub shaft and extending into the cylindrical air gap for free rotation relative to the magnet.

3. A servo motor with built-in viscous damping, comprising a motor having a rotor mounted on an axial main shaft; a fly-wheel; means co-axially supporting the fly-wheel for free rotation relative to said rotor; and magnetic means for elastically coupling the rotor and the fly-wheel; said magnetic means including a free-floating magnet as part of said fly-wheel and a rotatable cup as part of the rotor, the free-floating magnet and fly-wheel being independently rotatable except for the effects of eddy currents induced in the cup by relative motion between magnet and cup.

4. A servo motor with built-in damping, comprising a motor having a stationary frame, a stator on the stationary frame and a rotor on a main shaft supported for free rotation on the frame; a fly-wheel supported for free co-axial rotation relative to the shaft; a magnet carried by and rotatable with the fly-wheel to be freely rotatable relative to the shaft; and a drag cup element connected to and rotatable with the shaft in the field of influence of the magnet.

References Cited in the file of this patent
UNITED STATES PATENTS

| | | |
|---|---|---|
| 2,172,410 | Riggs | Sept. 12, 1939 |
| 2,403,605 | Lesnick | July 9, 1946 |
| 2,454,980 | Sobell | Nov. 30, 1948 |
| 2,516,698 | Hall | July 25, 1950 |
| 2,520,582 | Tustin | Aug. 29, 1950 |